United States Patent
Fitzgerald et al.

(10) Patent No.: US 11,746,251 B2
(45) Date of Patent: Sep. 5, 2023

(54) CHEMICAL AGENT RESISTANT COATING COMPOSITIONS

(71) Applicant: PPG Industries Ohio, Inc., Cleveland, OH (US)

(72) Inventors: Lawrence J. Fitzgerald, Gibsonia, PA (US); Anthony M. Chasser, Allison Park, PA (US); DeAnna D. Katz, Gibsonia, PA (US)

(73) Assignee: PPG INDUSTRIES OHIO, INC., Cleveland, OH (US)

( * ) Notice: Subject to any disclaimer, the term of this patent is extended or adjusted under 35 U.S.C. 154(b) by 299 days.

(21) Appl. No.: 16/822,339

(22) Filed: Mar. 18, 2020

(65) Prior Publication Data

US 2020/0399500 A1 Dec. 24, 2020

Related U.S. Application Data

(63) Continuation of application No. 14/639,178, filed on Mar. 5, 2015, now abandoned.

(60) Provisional application No. 61/948,140, filed on Mar. 5, 2014.

(51) Int. Cl.
| | | |
|---|---|---|
| *C09D 127/12* | (2006.01) | |
| *C09D 133/06* | (2006.01) | |
| *C09D 191/06* | (2006.01) | |
| *C09D 5/03* | (2006.01) | |
| *C08K 3/22* | (2006.01) | |

(52) U.S. Cl.
CPC ............. *C09D 127/12* (2013.01); *C09D 5/03* (2013.01); *C09D 133/06* (2013.01); *C09D 191/06* (2013.01); *C08K 3/22* (2013.01); *C08K 2003/2227* (2013.01)

(58) Field of Classification Search
CPC ...... C09D 127/12; C09D 5/03; C09D 133/06; C09D 191/06; C08K 3/22; C08K 2003/2227; C08K 5/29; C08L 91/06
USPC ....................................................... 524/437
See application file for complete search history.

(56) References Cited

U.S. PATENT DOCUMENTS

| | | |
|---|---|---|
| 4,965,102 A | 10/1990 | Inai |
| 5,691,410 A | 11/1997 | Escarsega et al. |
| 5,739,202 A | 4/1998 | Pecsok |
| 6,063,855 A | 5/2000 | Pecsok et al. |
| 7,605,194 B2 | 10/2009 | Ferencz et al. |
| 7,625,973 B2 | 12/2009 | Ambrose et al. |
| 8,030,396 B2 | 10/2011 | Ambrose et al. |
| 9,012,556 B1 | 4/2015 | Mahn |
| 9,206,320 B1 | 12/2015 | Daly et al. |
| 2003/0154885 A1 | 8/2003 | Krendlinger |
| 2004/0204536 A1 | 10/2004 | Miyatani et al. |
| 2006/0189719 A1 | 8/2006 | Ambrose |
| 2009/0258990 A1 | 10/2009 | Seneker et al. |
| 2012/0149820 A1* | 6/2012 | Fuhry ...................... C08J 7/043 |
| | | 525/309 |
| 2014/0275362 A1 | 9/2014 | Fenn et al. |

FOREIGN PATENT DOCUMENTS

| | | |
|---|---|---|
| CN | 101402814 A | 4/2009 |
| CN | 101671518 A | 3/2010 |
| CN | 102212221 B | 9/2013 |
| GB | 1097245 B2 | 1/1968 |
| JP | 08134224 A | 5/1996 |
| JP | 08231729 A | 10/1996 |
| JP | 2011168681 A | 9/2019 |
| WO | 99/47616 A1 | 9/1999 |

OTHER PUBLICATIONS

Ash, M. & I., Handbook of Plastic and Rubber Adhesives, 2nd Ed., vol. 1-2, pp. 521-522, Endicott, NY: Synapse Information Resources, Inc. (2013).
JP 08-231729 A (1996), machine translation. JPO Japan Platform for Patent Information (J-PlatPat).
CN 102212221 B (2013), machine translation, Google Patents.
U.S. Army Research Laboratory, Weapons and Materials Research Directorate, Materials Manufacturing Technology Branch, Specification and Standards Office, "Performance Specification Powder Coating, Camouflage Chemical Agent Resistant Systems," Maryland, USA, Nov. 23, 2010.
Specialchem, "The Ultimate Guide to Selecting Wetting & Dispersing Agents", Website. https://coatings.specialchem.com/selection-guide/wetting-and-dispersing-agents-for-coatings.

\* cited by examiner

*Primary Examiner* — Frances Tischler

(57) ABSTRACT

A chemical agent resistant coating composition can include a fluoropolymer, a dispersible acrylic resin, a flatting agent, and a hydrophobic additive. The coating composition can include at least 10 weight % of the flatting agent based on the total solids weight of the coating composition, and the flatting agent can include ground fiberglass, a hyperbranched (meth)acrylic resin, and an additional flatting agent. The hydrophobic additive can include a wax. When the composition is applied to a substrate and cured as a coating, the coating has an 85° gloss of less than 3.5, a water contact angle of greater than 80°, and desorbs a maximum of 180 micrograms of bis(2-chloroethyl) sulfide and a maximum of 40 micrograms of O-pinacolyl methylphosphonofluoridate, according to testing under MIL-PRF-32348. A method of preparing chemical agent resistant coating compositions and substrates at least partially coated with the chemical agent resistant coating compositions are also disclosed.

21 Claims, No Drawings

CHEMICAL AGENT RESISTANT COATING COMPOSITIONS

NOTICE OF GOVERNMENT SUPPORT

This invention was made with Government support under Contract No. W912HQ-13-C-0007 awarded by the Strategic Environmental Research and Development Program.

FIELD OF THE INVENTION

The present invention relates to chemical agent resistant coating compositions, methods of making such coating compositions, and substrates at least partially coated with a chemical agent resistant coating composition.

BACKGROUND OF THE INVENTION

Chemical agent resistant coatings (also referred to as "CARC") are commonly applied to military equipment, vehicles, and aircrafts that can be exposed to chemical and biological agents. Chemical agent resistant coatings resist biological and chemical agents. After being exposed to biological and chemical agents, biological and chemical agents may then be washed from the surface of the coatings during a decontamination process. As such, chemical agent resistant coatings are also designed to resist decontamination wash solutions. In addition, certain military specifications require that these coatings have an extremely low gloss to minimize visual detection due to glare or reflection from light sources.

While chemical agent resistant coatings have been developed over the years, the types of chemical agent resistant coatings currently available are limited. It is, therefore, desirable to provide new chemical agent resistant coatings.

SUMMARY OF THE INVENTION

The present invention is directed to a chemical agent resistant coating composition comprising: a fluoropolymer a flatting agent that comprises at least 10 weight % of the composition based on the total solid weight of the coating composition; and a hydrophobic additive that includes a wax. When the composition is applied to a substrate and cured as a coating, the coating has an 85° gloss of less than 3.5, a water contact angle of greater than 80°, and desorbs a maximum of 180 micrograms of bis(2-chloroethyl) sulfide and a maximum of 40 micrograms of O-pinacolyl methylphosphonofluoridate according to testing under MIL-PRF-32348 (November 2010).

The present invention is also directed to a method of preparing a chemical agent resistant coating composition. The method comprises mixing a fluoropolymer, a flatting agent such that the flatting agent comprises at least 10 weight % of the composition based on the total solid weight of the coating composition, and a hydrophobic additive that includes a wax so that when the coating composition is applied to a substrate and cured as a coating, the coating has an 85° gloss of less than 3.5, a water contact angle of greater than 80°, and desorbs a maximum of 180 micrograms of bis(2-chloroethyl) sulfide and a maximum of 40 micrograms of O-pinacolyl methylphosphonofluoridate according to testing under MIL-PRF-32348 (November 2010).

A substrate at least partially coated with the chemical agent resistant coating compositions is also described herein.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" fluoropolymer, "a" flatting agent, "a" hydrophobic additive, "an" acrylic resin, and the like refer to one or more of any of these items.

As indicated, the present invention is directed to a chemical agent resistant coating composition that can include a fluoropolymer, a flatting agent, and a hydrophobic additive. As used herein, a "chemical agent resistant coating composition" refers to a coating composition that when deposited onto a substrate and cured as a coating, resists biological and chemical agents. For example, chemical agent resistant coatings deposited from the compositions described herein resist bis(2-chloroethyl) sulfide (also known as Mustard Gas or HD) and O-pinacolyl methylphosphonofluoridate (also referred to as Soman or GD). Chemical agent resistant coatings deposited from the compositions described herein can also resist other chemical and biological agents known in the art.

As previously noted, the chemical agent resistant coating compositions can include a fluoropolymer. As used herein, a "polymer" refers to oligomers and both homopolymers and copolymers. The term "resin" is used interchangeably with "polymer". Further, the term "fluoropolymer" refers to polymers and copolymers (including polymers having two or more different monomers, including for example terpolymers) having a fluorine atom.

Non-limiting examples of fluoropolymers that can be used to form the chemical agent resistant coating compositions of the present invention include polyvinylidene fluoride (PVDF), polyhexafluoropropylene (PHFP), polytetrafluoroethylene (PTFE), polyperfluoromethylvinylether (PMVE), and combinations thereof, as well as copolymers and terpolymers thereof. For example, the fluoropolymer can be a chlorotrifluoroethylene copolymer, such as the chlorotrifluoroethylene copolymer commercially available from Asahi Glass Co. under the trade name LUMIFLON®.

The fluoropolymers used with the coating compositions of the present invention can be in solid or liquid form. For instance, the fluoropolymer can be a solid polyvinylidene fluoride (PVDF), such as the solid polyvinylidene fluoride (PVDF) commercially available from Arkema under the trade name KYNAR®. Alternatively, the fluoropolymer can be a liquid form of polyvinylidene fluoride (PVDF).

The fluoropolymer can comprise at least 5 weight %, at least 8 weight %, at least 10 weight %, at least 20 weight %, at least 30 weight %, or at least 40 weight %, based on the total solids weight of the coating composition. The fluoropolymer can comprise at most 70 weight %, at most 60 weight %, or at most 50 weight %, based on the total solids weight of the composition. The fluoropolymer can also comprise a range such as from 5 to 70 weight %, from 8 to 60 weight %, or from 10 to 50 weight %, based on the total solids weight of the composition.

As indicated above, the chemical agent resistant coating compositions can also include a flatting agent. As used herein, the term "flatting agent" refers to a material added to a coating composition to reduce the gloss of a coating formed from the composition. The term "flatting agent" is interchangeable with the term "matting agent".

Non-limiting examples of suitable flatting agents that can be used with the coating compositions described herein include metal hydroxides, ground fiberglass, metal oxides, silicas, hyperbranched (meth)acrylic polymers, polyurea particles, polyolefin particles, and mixtures thereof. The flatting agents used with the coating compositions described herein can also have a melting point of greater than 190° C., or greater than 200° C., or greater than 210° C., or greater than 220° C.

When silica is used as a flatting agent with the coating composition, it can be used in various forms including, but not limited to, amorphous, aerogel, diatomaceous, hydrogel, fumed, and combinations thereof.

As used herein, the term "hyperbranched (meth)acrylic polymer" refers to a polymer having a main polymer chain and at least two branching points along the main polymer chain. The hyperbranched (meth)acrylic polymers of the present invention can exhibit an alpha parameter derived from the Mark-Houwink equation of 0.2 to 0.7, or an alpha parameter derived from the Mark-Houwink equation of 0.3 to 0.6. The Mark-Houwink relationship between molar mass (M) and intrinsic viscosity ($\eta$) ($[\eta]=K \cdot M\alpha$) provides information about the structure of the polymer. The alpha parameter indicates the degree of branching and can be determined by multi detection size-exclusion chromatography as described by Paillet et al, Journal of Polymer Science Part A: Polymer Chemistry, 2012, 50, 2967-2979, which is incorporated by reference herein. Further, the term (meth)acrylic refers to acrylic and methacrylic, as well as their esters.

The hyperbranched (meth)acrylic polymers can be hydroxyl or carboxyl group functional. Non-limiting examples of hyperbranched (meth)acrylic polymers and methods of preparing them are described in United States Patent Application Publication No. 2014/0275362 at paragraphs [0016] to [0029], which are incorporated by reference herein.

The hyperbranched (meth)acrylic polymer can have a weight average molecular weight of greater than 3,000 g/mol, or greater than 10,000 g/mol, or greater than 100,000 g/mol, or at least 200,000 g/mol, as determined by standard gel permeation chromatography.

As noted, the flatting agent can include ground fiberglass. As used herein, "ground fiberglass" refers to continuous strands of glass fibers that have been extruded into fine filaments and ground to a desired size. The ground fiberglass can have an average size dimension of 30 to 70 microns, or 35 to 60 microns, or 35 to 55 microns, or 40 to 50 microns. The ground fiberglass can also have an average size dimension that allows the fiberglass to be passed through a 250 to 375 mesh filter, or a 275 to 350 mesh filter, or a 300 to 350 mesh filter, or a 325 mesh filter. As used herein, "average size dimension" refers to the size of 50 weight percent or more of the ground fiberglass in a sample.

Non-limiting examples of metal hydroxides that can be used as a flatting agent include aluminum hydroxide, titanium hydroxide, cobalt hydroxide, iron hydroxide, chrome hydroxide, tin hydroxide, antimony hydroxide, manganese hydroxide, and combinations thereof. Non-limiting examples of metal oxides that can be used as a flatting agent include aluminum oxide, titanium oxide, cobalt oxide, iron oxide, chrome oxide, tin oxide, antimony oxide, manganese oxide, and combinations thereof. The metal oxide can form crystal structures including, but not limited to, rutile, hematite, spinel, and combinations thereof.

Non-limiting examples of polyurea particles that can be used include those commercially available from Albemarle Corp. under the trade name PERGOPAK® such as PERGOPAK® M3, M4, M5, and M6. Other non-limiting examples include those commercially available from Deuteron GmbH under the trade name Deuteron® MK and MK-FF.

Non-limiting examples of polyolefin particles that can be used as a flatting agent include polyethylene particles, polypropylene particles, and combinations thereof. Such particles can also be used as a dispersion.

The flatting agent can comprise at least 10 weight %, at least 15 weight %, at least 20 weight %, at least 30 weight %, or at least 40 weight % based on the total solid weight of the composition. The flatting agent can also comprise at most 80 weight %, at most 70 weight %, at most 60 weight %, or at most 50 weight %, based on the total solid weight of the composition. The flatting can also comprise a range such as from 10 to 80 weight %, from 20 to 70 weight %, from 20 to 50 weight %, from 30 to 40 weight %, or from 35 to 70 weight %, based on the total solid weight of the composition.

The flatting agents described herein can be added to help reduce the gloss of a coating. For example, the flatting agent can be added to help obtain a chemical agent resistant coating having an 85° gloss of less than 3.5, less than 2.5, less than 2, less than 1.5, less than 1, or less than 0.5. The flatting agent can also help obtain a chemical agent resistant coating having a 60° gloss of less than 3.5, less than 2.5, less than 2, less than 1.6, less than 1.5, less than 1, or less than 0.5. The 60° and 85° gloss measurements are determined with a Statistical Novo-Gloss 20° gloss meter.

The coating compositions of the present invention can also include a hydrophobic additive. As used herein, the term "hydrophobic additive" refers to a material that can increase the water repellency of a coating. The hydrophobic additive used with the coating compositions of the present invention are compatible with the fluoropolymer, flatting agent, and other components described herein. The hydrophobic additive can have a melting point of less than 130° C., or less than 120° C., or less than 110° C., or less than 100° C. Suitable hydrophobic additives that can be used with the coating compositions of the present invention include, but are not limited to, waxes, such as fluorinated waxes for example. Non-limiting examples of suitable waxes that can be used include polytetrafluoroethylene wax, polytetrafluoroethylene-modified polyethylene wax, polytetrafluoroethylene-modified polypropylene wax, carnauba wax, silicone wax, polyethylene wax, polypropylene wax, paraffinic wax, and mixtures thereof.

The hydrophobic additive can comprise at least 0.01 weight %, at least 0.05 weight %, at least 0.1 weight %, at least 0.5 weight %, at least 1 weight %, at least 2 weight %, at least 3 weight %, or at least 5 weight %, based on the total solid weight of the composition. The hydrophobic additive can comprise at most 20 weight %, at most 15 weight %, or at most 10 weight %, based on the total solid weight of the composition. The hydrophobic additive can also comprise a range such as from 0.01 to 20 weight %, from 0.1 to 15 weight %, from 0.5 to 15 weight %, from 1 to 10 weight %, or from 3 to 10 weight %, based on the total solid weight of the composition.

The chemical agent resistant coating compositions can comprise a hydrophobic additive, fluoropolymer, and flatting agent such that, when applied to a substrate as a coating, the coating has a water contact angle of greater than 80°, or greater than 90°, or greater than 100, or greater than 110°. The water contact angles may be measured with the Kruss DSA 100. Methylene iodide and water may be used to determine surface energy of panels. Typically, five drops of each liquid are used with the contact angles measured four seconds after deposition. Drop volume of 2.0 µl for each liquid is used. Contact angles are analyzed using the Owens-Wendt-Rabel and Kaelble method to calculate surface energy. Temperature and humidity at the time of testing may be 73° F. and 49% RH.

In addition to extremely low gloss and high water contact angles, coatings deposited from the coating compositions comprising a hydrophobic additive, fluoropolymer, and flatting agent exhibit superior durability and chemical resistance. For example, the chemical agent resistant coatings resist bis(2-chloroethyl) sulfide and O-pinacolyl methylphosphonofluoridate such that after exposure to these chemical agents, the coatings desorb a maximum of 180 micrograms of bis(2-chloroethyl) sulfide and a maximum of 40 micrograms of O-pinacolyl methylphosphonofluoridate, according to testing under United States military specification MIL-PRF-32348 (November 2010), which is incorporated by reference herein in its entirety. Bis(2-chloroethyl) sulfide is commonly referred to as Mustard Gas or HD, and O-pinacolyl methylphosphonofluoridate is commonly referred to as Soman or GD. The coatings can also desorb a maximum of 80 micrograms, a maximum of 70 micrograms, a maximum of 60 micrograms, a maximum of 50 micrograms, a maximum of 40 micrograms, a maximum of 30 micrograms, or a maximum of 20 micrograms of bis(2-chloroethyl) sulfide. In addition, the coatings can desorb a maximum of 35 micrograms, a maximum of 30 micrograms, a maximum of 25 micrograms, or a maximum of 20 micrograms of O-pinacolyl methylphosphonofluoridate. The coatings deposited from the coating compositions described herein can resist various other chemical and biological agents known in the art.

As further required by MIL-PRF-32348 (November 2010), the chemical agent resistant coatings are resistant to decontamination solutions. For example, the chemical agent resistant coatings were found to be resistant to super tropical bleach, a chlorinated lime, as tested in accordance with MIL-PRF-32348 (November 2010).

Further, the chemical agent resistant coating compositions can also include a dispersible resin. The resin can be water or solvent dispersible. For example, the resin can be a water dispersible acrylic resin having acid functionality. The term "water dispersible" means that the resin is a polymer or oligomer that is solubilized, partially solubilized, and/or dispersed in some quantity of a water solution with or without additional water soluble solvents. The solution, which can be used with the compositions described herein, can be at least 50% water, at least 60% water, at least 70% water, at least 80% water, at least 90% water, or 100% water, based on the total weight of the solution. The solution can also be less than 50% cosolvent, at most 40% cosolvent, at most 30% cosolvent, at most 20% cosolvent, or at most 10% cosolvent, based on the total weight of the solution. Suitable cosolvents include, for example, aliphatic hydrocarbons, aromatic hydrocarbons, ketones, esters, glycols, ethers, ether esters, glycol ethers, glycol ether esters, alcohols, ether alcohols, phthalate plasticizers, N-methyl pyrrolidone, and combinations thereof. Phthalate plasticizers include phthalates esters such as diethylhexyl phthalate, diisononyl phthalate, diisodecyl phthalate, dioctyl phthalate, and butyl benzyl phthalate.

The dispersible resin can also be solvent dispersible, such as a solvent dispersible acrylic resin having acid functionality. A "solvent dispersible" resin is a polymer or oligomer that is solubilized, partially solubilized, and/or dispersed in a solvent solution where the majority of the solution is a solvent other than water. Suitable solvents that make up the majority of such a solution, which can be used with the compositions described herein, include, but are not limited to, any of the cosolvents previously described. For example, the solvent solution can comprise at least 50% cosolvent, at least 60% cosolvent, at least 70% cosolvent, at least 80% cosolvent, at least 90% cosolvent, or 100% cosolvent, based on the total weight of the solution. Such solvent solutions can also include less than 50% water, at most 40% water, at most 30% water, at most 20% water, or at most 10% water, based on the total weight of the solution.

The dispersible resin can comprise at least 50 weight % methyl (meth)acrylate, at least 60 weight % methyl (meth)acrylate, or at least 70 weight % methyl (meth)acrylate, based on the total weight of the resin, as determined by standard gel permeation chromatography.

The dispersible resin can also have an acid value of at least 10 mg KOH/g, at least 20 mg KOH/g, or at least 30 mg KOH/g. The dispersible resin can have an acid value of at most 100 mg KOH/g, at most 90 mg KOH/g, at most 80 mg KOH/g, or at most 60 mg KOH/g. The dispersible resin can also have an acid value range such as from 10 to 100 mg KOH/g, from 15 to 60 mg KOH/g, or from 20 to 40 mg KOH/g.

Further, the dispersible resin can have a glass transition temperature of greater than 40° C., or greater than 50° C., or greater than 60° C., or greater than 70° C. The glass transition temperature (Tg) is determined by differential scanning calorimetry.

The dispersible resin can comprise at least 1 weight %, at least 2 weight %, or at least 5 weight % of the coating composition, based on the total solid weight of the composition. The dispersible resin can comprise at most 20 weight %, at most 15 weight %, at most 10 weight %, or at most 7 weight % of the coating composition, based on the total solid weight of the composition. The dispersible resin can also comprise a range such as from 1 to 20 weight %, from 2 to 15 weight %, or from 2 to 7 weight % of the coating composition, based on the total solid weight of the coating composition.

A crosslinker can also be used with the chemical agent resistant coating compositions. As used herein, a "crosslinker" refers to a molecule comprising two or more functional groups that are reactive with other functional groups and which is capable of linking two or more monomers or polymer molecules through chemical bonds. The crosslinker can be in solid or liquid form. Non-limiting examples of suitable crosslinkers include hydroxyalkyl amides, glycidyl functional acrylics, triglycidylisocyanurate, carbodiimides, such as those commercially available from Dow as UCAR-LINK, melamines, such as those available from Cytec as CYMEL®, and blocked isocyanates, such as those available from Bayer as CRELAN®.

Alternatively, the chemical agent resistant coating compositions may be substantially free, essentially free, or completely free of a crosslinker. The term "substantially free" as used in this context means the coating compositions contain less than 1000 parts per million (ppm), "essentially free" means less than 100 ppm, and "completely free" means less than 20 parts per billion (ppb) of a crosslinker.

The coating compositions of the present invention can also include other optional materials well known in the art of formulating coatings. For example, the coating compositions of the present invention can also include a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

The chemical agent resistant coating compositions can include pigment particles that can comprise at least 1 weight %, at least 3 weight %, or at least 5 weight % of the coating composition, based on total solid weight of the coating composition. The pigment particles can comprise at most 70 weight %, at most 50 weight %, or at most 25 weight % of the coating composition, based on total solid weight of the coating composition. The pigment particles that can also comprise a range such as from 1 to 70 weight %, from 3 to 50 weight %, or from 5 to 25 weight % of the coating composition, based on total solid weight of the coating composition.

In addition, the coating compositions can also include additional film-forming resins. For example, the coating compositions can also include certain amounts of polyurethanes, polyesters, polyamides, polyethers, polysiloxanes, epoxy resins, vinyl resins, copolymers thereof, and combinations thereof. As used herein, a "film-forming resin" refers to a resin that can form a self-supporting continuous film on at least a horizontal surface of a substrate upon removal of any diluents or carriers present in the composition or upon curing.

Alternatively, the coating compositions may be substantially free, essentially free, or completely free of additional film-forming films such as those previously described. The term "substantially free" as used in this context means the coating compositions contain less than 1000 parts per million (ppm), "essentially free" means less than 100 ppm, and "completely free" means less than 20 parts per billion (ppb) of additional film-forming films, such as those previously described.

Other non-limiting examples of materials that can be used with the coating compositions of the present invention include plasticizers, abrasion resistant particles, corrosion resistant particles, corrosion inhibiting additives, fillers including, but not limited to, micas, talc, clays, and inorganic minerals, anti-oxidants, hindered amine light stabilizers, UV light absorbers and stabilizers, surfactants, flow and surface control agents, thixotropic agents, reactive diluents, catalysts, reaction inhibitors, and other customary auxiliaries.

The present invention is also directed to a method of preparing chemical agent resistant coating compositions. The method can comprise mixing the fluoropolymer, flatting agent, and hydrophobic additive such that when the coating composition is applied to a substrate and cured as a coating, the coating has a low gloss, high water contact angle, and excellent chemical resistance. For instance, the fluoropolymer, flatting agent, and hydrophobic additive can be mixed together such that when the coating composition is applied to a substrate and cured as a coating, the coating has an 85° gloss of less than 3.5, a water contact angle of greater than 80°, and desorbs a maximum of 180 micrograms of bis(2-chloroethyl) sulfide and a maximum of 40 micrograms of O-pinacolyl methylphosphonofluoridate, according to testing under MIL-PRF-32348 (November 2010). The method can also include mixing any of the other components identified above including, but not limited to, a dispersible acrylic resin, crosslinker, and/or colorant.

The method of preparing the chemical agent resistant coating compositions can include dispersing the mixture in water. Alternatively, the mixture can be dispersed in a solvent including, but not limited to, any of the solvents described above. The chemical agent resistant coating composition can then be applied to a substrate as a liquid and cured to form a chemical agent resistant coating. "Curing" refers to bond formation resulting in the formation of a crosslinked coating. It will be appreciated that the cure parameters will vary depending on the fluoropolymer, flatting agent, hydrophobic additive, optional dispersible resin, and other components, but such parameters can be readily determined by one skilled in the art.

The chemical agent resistant coating composition can also be applied to a substrate as a powder rather than as a liquid. As such, the method can further include drying the mixture. The mixture can be dried according to any means known in the art. Suitable methods for drying are spray drying, tray drying, freeze drying, fluid bed drying, single and double drum drying, flash drying, swirl drying, and numerous other evaporation techniques. The dry mixture can also be ground to a desired particle size. Grinding can be accomplished by any means known in the art, such as through the use of an air classifying mill.

As indicated, the fluoropolymer can be used in solid or liquid form. The solid or liquid fluoropolymer can be dispersed in water or solvent with the flatting agent, hydrophobic additive, and other components, and optionally dried to form a powder using the techniques described above.

The chemical agent resistant coating compositions can be applied to a wide range of substrates known in the coatings industry. For example, the chemical agent resistant coating compositions can be applied to automotive substrates, industrial substrates, packaging substrates, wood flooring and furniture, apparel, electronics, including housings and circuit boards, glass and transparencies, sports equipment, including golf balls, and the like. These substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, medium density fiberboard, cement, stone, glass, paper, cardboard, textiles, leather both synthetic and natural, and the like.

The chemical agent resistant coating compositions of the present invention are particularly useful when applied to substrates used for military equipment, vehicles, and aircrafts. For example, the chemical agent resistant coating compositions can be applied to pretreated cold rolled steel, galvanized steel, aluminum, or a combinations thereof that are found on military equipment, vehicles, and aircrafts.

The coatings of the present invention can be applied by any means standard in the art, such as electrocoating, spraying, electrostatic spraying, dipping, rolling, brushing, and the like. The coatings of the present invention can be applied to a dry film thickness of at least 0.5 mil, 1 mil, or 2 mils. The coatings of the present invention can be applied to a dry film thickness of at most 5 mils, at most 4 mils, or at most 3 mils. The coatings of the present invention can also be applied at a dry film thickness range such as from 0.5 mil to 5 mils, such as from 1 mil to 4 mils, or from 2 mils to 3 mils.

The coating compositions of the present invention may also be used alone or in combination with primers, basecoats, and/or topcoats. A "primer coating composition" refers to coating compositions from which an undercoating may be deposited onto a substrate in order to prepare the surface for application of a protective or decorative coating system. A basecoat refers to a coating composition from which a coating is deposited onto a primer and/or directly onto a substrate optionally including components (such as pigments) that impact the color and/or provide other visual impact and which may be overcoated with a protective and decorative coating system.

It will be appreciated from the following examples that the coating compositions described herein provide coatings having extremely low gloss, high water contact angles, and superior chemical resistance, which meets the strict requirements to qualify the coatings as a CARC. The following examples are presented to demonstrate the general principles of the invention. The invention should not be considered as limited to the specific examples presented. All parts and percentages in the examples are by weight unless otherwise indicated.

Example 1

Preparation of a Chemical Agent Resistant Coating Composition

A chemical agent resistant coating composition according to the present invention was prepared with the following ingredients shown in Table 1.

TABLE 1

| Ingredients | Weight (grams) |
| --- | --- |
| LUMIFLON ® 710 LF [1] | 183.0 |
| VESTAGON ®B 1400 [2] | 47.0 |
| Tris(2,3-epoxypropyl)isocyanurate [3] | 5.0 |
| Benzoin [4] | 1.5 |
| V-12600 Green [5] | 17.15 |
| G-8599 Green [6] | 20.05 |
| MAPICO ® Tan 20A [7] | 6.21 |
| Carbazole Violet [8] | 0.21 |
| MODAFLOW ® [9] | 2.5 |
| IRGANOX ® 1076 [10] | 1.1 |
| DT 3329 [11] | 5.0 |
| MARTINAL ® Aluminum Hydroxide [12] | 600.0 |

[1] Chlorotrifluoroethylene copolymer, commercially available from Asahi Glass.
[2] Polyisocyanate adduct having e-caprolactam blocked NCO-groups, commercially available from Evonik Industries.
[3] Trifunctional epoxy used as a crosslinking agent.
[4] 2-hydroxy-1,2-di(phenyl)ethanone used as an anti-gassing additive.
[5] Cobalt chromite based inorganic green color pigment, commercially available from Ferro Corporation.
[6] Chromic oxide based dark green pigment, commercially available from Elementis Chemical Corp.
[7] Dark tan magnesium ferrite pigment, commercially available from Rockwood Pigments.
[8] Dioxazine blue tone pigment, commercially available from Crenovo International Limited.
[9] Flow modifier, commercially available from Cytec Industries.
[10] Sterically hindered phenolic antioxidant, commercially available from Ciba Specialty Chemicals Corp.
[11] Blend of wax and mercaptobenzothiazole, commercially available from Huntsman Corp.
[12] Aluminum hydroxide, commercially available from Albemarle Corp.

The ingredients shown in Table 1 were mixed in a Henschel mixer. The mixed ingredients were then hot melt mixed on a 19 MM Baker Perkins extruder at rotational speeds of 350 rps. After melt mixing, the mixture was allowed to cool. The resulting mixture was then ground on a Micron unit ACM 1 to a particle size of 30 microns.

Example 2

Preparation of a Chemical Agent Resistant Coating Composition

A chemical agent resistant coating composition according to the present invention was prepared with the following ingredients shown in Table 2.

TABLE 2

| Ingredients | Weight (grams) |
| --- | --- |
| Acrylic Resin [13] | 177.7 |
| V-12600 Green [5] | 9.6 |
| G-8599 Green [6] | 14.3 |
| MAPICO ® Tan 20A [7] | 3.0 |
| Carbazole Violet [8] | 0.130 |
| Pigment Black 7 [14] | 0.024 |
| MAPICO ® Black Iron Oxide [15] | 0.22 |
| Portafill ® A40 [16] | 132.0 |
| Methyl Isobutyl Ketone | 6.4 |
| TINUVIN ® 144 [17] | 1.0 |
| TINUVIN ® 900 [18] | 0.55 |
| LANCO ™ 1778 [19] | 7.7 |
| PRIMID ® XL552/deionized water mix (1:1 ratio) [20] | 11.0 |
| KYNAR ® 500 [21] | 56.0 |

[13] Acrylic resin having greater than 50 weight % methyl (meth)acrylate based on the total weight of the acrylic resin, less than 12 weight % methacrylic acid based on the total weight of the acrylic resin, and a glass transition temperature of about 94° C.
[14] Carbon black pigment.
[15] Iron oxide black pigment, commercially available from Rockwood Pigments.
[16] Matting filler produced from aluminum hydroxide, commercially available from Sibelco Specialty Mineral Europe.
[17] Light stabilizer of the hindered amine class, commercially available from Ciba Specialty Chemicals Corp.
[18] UV absorber of the hydroxyphenylbenzotriazole class, commercially available from Ciba Specialty Chemicals Corp.
[19] Micronized PTFE-modified polyethylene wax, commercially available from Lubrizol Advanced Materials Inc.
[20] Hydroxyalkylamide crosslinker, commercially available from EMS-GRILTECH, mixed with deionized water at a ratio of 1:1.
[21] Solid polyvinylidene fluoride, commercially available from Arkema.

The ingredients shown in Table 2 were weighed into a 1000 ml container and mixed with a Cowles mixer for 20 to 40 minutes or until a particle size of +6 was obtained, as measured on a Hegman's gauge. The mixture was dried by conventional techniques known in the art. The resulting sheet was then ground on a Micron unit ACM 1 to a particle size of 30 microns.

Example 3

Preparation of a Chemical Agent Resistant Coating Composition

A chemical agent resistant coating composition according to the present invention was prepared with the following ingredients shown in Table 3.

TABLE 3

| Ingredients | Weight (grams) |
| --- | --- |
| Acrylic Resin [22] | 177.7 |
| V-12600 Green [5] | 9.6 |
| G-8599 Green [6] | 14.3 |
| MAPICO ® Tan 20A [7] | 3.0 |
| Carbazole Violet [8] | 0.130 |
| Pigment Black 7 [14] | 0.024 |
| MAPICO ® Black Iron Oxide [15] | 0.22 |
| TEXO ® ground fiberglass [23] | 90 |
| Methyl Isobutyl Ketone | 6.4 |
| TINUVIN ® 144 [17] | 1.0 |
| TINUVIN ® 900 [18] | 0.55 |
| LANCO ™ 1778 [19] | 7.7 |
| PRIMID ® XL552/deionized water mix (1:1 ratio) [20] | 11.0 |
| KYNAR ® 500 [21] | 56 |

[22] Acrylic resin having greater than 50 weight % methyl (meth)acrylate based on the total weight of the acrylic resin, less than 12 weight % methacrylic acid based on the total weight of the acrylic resin, and a glass transition temperature of about 69° C.
[23] TEXO ® ground fiberglass is washed, ground and filtered through a 325 mesh filter - supplied by PPG Industries.

The ingredients shown in Table 3 were weighed into a 1000 ml container and mixed with a Cowles mixer for 20 to 40 minutes or until a particle size of +6 was obtained, as measured on a Hegman's gauge. The mixture was dried by conventional techniques known in the art. The resulting sheet was then ground on a Micron unit ACM 1 to a particle size of 30 microns.

Example 4

Preparation and Evaluation of Chemical Agent Resistant Coatings

The chemical agent resistant coating compositions of Examples 1-3 were each sprayed onto a cold rolled steel metal panel as a powder composition with an electrostatic spray at 75 k. The coating compositions were sprayed at a thickness of 2 to 3 mils. Panels were then baked for 15-25 minutes at a temperature of 425° F. The resulting coatings were evaluated for various properties, the results of which are shown in Table 4.

TABLE 4

| Performance/Physical Properties | EXAMPLE 1 Testing Results | EXAMPLE 2 Testing Results | Example 3 Testing Results |
| --- | --- | --- | --- |
| 60° Gloss [24] | 1 | 0.2 | 0.4 |
| 85° Gloss [24] | 1.4 | 0.3 | 0.5 |
| MEK Double Rubs [25] | +100 | +100 | +100 |
| Adhesion [26] | 5B | 5B | 5B |
| Recoat [27] | Pass | Pass | Pass |
| Ra Value [28] | 200μ inch | 270μ inch | 260μ inch |
| CARC HD Desorption [29] | <3 μg | <13 μg | 42 μg |
| CARC GD Desorption [30] | <3 μg | <13 μg | 28 μg |
| Super Tropical Bleach Resistance [31] | Pass | Pass | Pass |
| 340 QUV 1000 hrs [32] | 100% gloss retention | 100% gloss retention | 100% gloss retention |
| WOM 1000 hrs [33] | 100% gloss retention | 100% gloss retention | 100% gloss retention |
| Water Contact Angle [34] | 84° | 110° | 105° |

[24] 60° and 85° gloss was measured with a Statistical Novo-Gloss 20° gloss meter, available from Paul N. Gardner Company, Inc.
[25] MEK double rubs refers to the chemical resistance of the coatings to methyl ethyl ketone (MEK), evaluated in accordance with ASTM D4752-10(2015).
[26] Adhesion measured in accordance with ASTM D3359-09e2. Adhesion is assessed on a scale of 0 to 5.
[27] Recoating was performed and evaluated in accordance with MIL-PRF-32348 (November 2010), section 4.6.13, which requires that the recoating of a dried film produce no lifting, softening, or other film irregularity.
[28] Ra value is the surface roughness of a coating, which was measured with a Surtronic 25 profilometer.
[29] CARC HD is the measure of the retention of bis(2-chloroethyl) sulfide in accordance with MIL-PRF-32348 (November 2010) section 3.6.10 and 4.6.19 type III coatings.
[30] CARC GD is the measure of the retention of O-pinacolyl methylphosphonofluoridate in accordance with MIL-PRF-32348 (November 2010) section 3.6.10 type III coatings.
[31] Super tropical bleach is a chlorinated lime and is used to test chemical resistance in accordance MIL-PRF-32348 (November 2010), section 4.6.18.
[32] Gloss retention test method according to ASTM D4214-07.
[33] Gloss retention test method according to SAE J2025-1989.
[34] Water contact angles were measured with the Kruss DSA 100. Methylene iodide and water were used to determine surface energy of panels. Five drops of each liquid were used with the contact angles measured four seconds after deposition. Drop volume of 2.0 μl for each liquid was used. Contact angles were analyzed using the Owens-Wendt-Rabel and Kaelble method to calculate surface energy. Temperature and humidity at the time of testing were 73° F. and 49% RH.

As shown in Table 4, coatings deposited from the chemical agent resistant coatings compositions of the present invention exhibited extremely low gloss, high water contact angles, and superior chemical resistance to both Mustard Gas and Soman, as well as to other chemicals, including those used as decontamination solutions. The coatings deposited from the coating compositions of Examples 1-3 also exhibited excellent weather resistance, adhesion to substrates, and smoothness.

The present invention also includes the following clauses.

Clause 1: A chemical agent resistant coating composition comprising: a fluoropolymer, a flatting agent comprising at least 10 weight % of the composition based on the total solids weight of the coating composition, and a hydrophobic additive comprising a wax, wherein when the composition is applied to a substrate and cured as a coating, the coating has an 85° gloss of less than 3.5, a water contact angle of greater than 80°, and desorbs a maximum of 180 micrograms of bis(2-chloroethyl) sulfide and a maximum of 40 micrograms of O-pinacolyl methylphosphonofluoridate, according to testing under MIL-PRF-32348.

Clause 2: The coating composition of clause 1, wherein the coating has a water contact angle of greater than 100°.

Clause 3: The coating composition of any of clauses 1-2, wherein the coating desorbs a maximum of 80 micrograms of bis(2-chloroethyl) sulfide and a maximum of 35 micrograms of O-pinacolyl methylphosphonofluoridate.

Clause 4: The coating composition of any of clauses 1-3, wherein the fluoropolymer comprises polyvinylidene fluoride, chlorotrifluoroethylene copolymer, or a mixture thereof.

Clause 5: The coating composition of any of clauses 1-4, wherein the flatting agent comprises a metal hydroxide, metal oxide, silica, a hyperbranched (meth)acrylic polymer, a polyurea particle, a polyolefin particle, ground fiberglass, or mixtures thereof.

Clause 6: The coating composition of clause 5, wherein the fiberglass comprises an average size dimension of 30 to 70 microns.

Clause 7: The coating composition of clause 1, wherein the wax is a fluorinated wax.

Clause 8: The coating composition of clause 1, wherein the wax comprises polytetrafluoroethylene wax, polytetrafluoroethylene-modified polyethylene wax, polytetrafluoroethylene-modified polypropylene wax, polyethylene wax, polypropylene wax, paraffinic wax, carnauba wax, silicone wax, or combinations thereof.

Clause 9: The coating composition of any of clauses 1-8, wherein the coating composition further comprises a dispersible acrylic resin.

Clause 10: The coating composition of clause 9, wherein the acrylic resin has an acid value of 10 to 100 mg KOH/g.

Clause 11: The coating composition of any of clauses 9-10, wherein the acrylic resin comprises greater than 50 weight % methyl (meth)acrylate based on the total weight of the acrylic resin.

Clause 12: The coating composition of any of clauses 9-11, wherein the acrylic resin has a glass transition temperature of greater than 40° C.

Clause 13: The coating composition of any of clauses 1-12, wherein the coating composition is a powder coating composition.

Clause 14: The coating composition of any of clauses 1-13, wherein the coating composition further comprises a crosslinker.

Clause 15: The coating composition of any of clauses 1-13, wherein the coating composition is completely free of a crosslinker.

Clause 16: A substrate at least partially coated with the coating composition of any of clauses 1-15.

Clause 17: A method of preparing a chemical agent resistant coating composition comprising mixing a fluoropolymer, a flatting agent such that the flatting agent comprises at least 10 weight % of the composition based on the total solid weight of the coating composition, and a hydrophobic additive comprising a wax, wherein when the coating composition is applied to a substrate and cured as a coating, the coating has an 85° gloss of less than 3.5, a water contact angle of greater than 80°, and desorbs a maximum of 180 micrograms of bis(2-chloroethyl) sulfide and a maximum of 40 micrograms of O-pinacolyl methylphosphonofluoridate, according to testing under MIL-PRF-32348.

Clause 18: The method of clause 17, further comprising dispersing the mixture in water.

Clause 19: The method of any of clauses 17-18, further comprising drying the mixture to form a powder coating composition.

Whereas particular embodiments of this invention have been described above for purposes of illustration, it will be evident to those skilled in the art that numerous variations of the details of the present invention may be made without departing from the invention as defined in the appended claims.

The invention claimed is:

1. A chemical agent resistant coating composition comprising:
   a fluoropolymer;
   a dispersible acrylic resin;
   a flatting agent comprising at least 10 weight % based on the total solids weight of the coating composition, wherein the flatting agent comprises:
   (i) a hyperbranched (meth)acrylic resin different from the dispersible acrylic resin, wherein the hyperbranched (meth)acrylic resin has a weight average molecular weight of greater than 100,000; and
   (ii) an additional flatting agent different from component (i), comprising a metal hydroxide, a metal oxide, a poly(urea) particle, silica, or mixtures thereof; and
   a hydrophobic additive comprising a wax,
   wherein when the composition is applied to a substrate and cured as a coating, the coating has an 85° gloss of less than 3.5, a 60° gloss of less than 1.5, a water contact angle of greater than 80°, and desorbs a maximum of 180 micrograms of bis(2-chloroethyl) sulfide and a maximum of 40 micrograms of O-pinacolyl methylphosphonofluoridate, according to testing under MIL-PRF-32348.

2. The coating composition of claim 1, wherein the flatting agent additionally comprises (iii) ground fiberglass.

3. The coating composition of claim 1, wherein the additional flatting agent (ii) comprises aluminum hydroxide or aluminum oxide.

4. The coating composition of claim 1, wherein the additional flatting agent (ii) comprises a poly(urea) particle.

5. The coating composition of claim 1, wherein the fluoropolymer comprises polyvinylidene fluoride, chlorotrifluoroethylene copolymer, or a combination thereof.

6. The coating composition of claim 2, wherein the fiberglass has an average size dimension of 30 to 70 microns.

7. The coating composition of claim 1, wherein the wax is a fluorinated wax.

8. The coating composition of claim 1, wherein the wax comprises polytetrafluoroethylene wax, polytetrafluoroethylene-modified polyethylene wax, polytetrafluoroethylene-modified polypropylene wax, polyethylene wax, polypropylene wax, paraffinic wax, carnauba wax, silicone wax, or combinations thereof.

9. The coating composition of claim 1, wherein the dispersible acrylic resin has an acid value of 30 to 100 mg KOH/g.

10. The coating composition of claim 1, wherein the dispersible acrylic resin comprises greater than 50 weight % methyl (meth)acrylate based on the total weight of the acrylic resin.

11. The coating composition of claim 1, wherein the dispersible acrylic resin has a glass transition temperature of greater than 40° C.

12. The coating composition of claim 1, wherein the fluoropolymer comprises from 20 to 40 weight % based on the total solid weight of the coating composition.

13. The coating composition of claim 12, wherein the dispersible acrylic resin comprises from 30 to 50 weight % based on the total solid weight of the coating composition.

14. The coating composition of claim 1, wherein the coating composition is a powder coating composition.

15. The coating composition of claim 1, wherein the coating composition is completely free of a crosslinker.

16. The coating composition of claim 1, wherein when the composition is applied to a substrate and cured as a coating, the coating has a 60° gloss of equal to or less than 1.0.

17. A substrate at least partially coated with the coating composition of claim 1.

18. A method of preparing a chemical agent resistant coating composition comprising mixing:
- a fluoropolymer;
- a dispersible acrylic resin;
- a flatting agent comprising at least 10 weight % based on the total solids weight of the coating composition, wherein the flatting agent comprises:
  - (i) a hyperbranched (meth)acrylic resin different from the dispersible acrylic resin, wherein the hyperbranched (meth)acrylic resin has a weight average molecular weight of greater than 100,000; and
  - (ii) an additional flatting agent different from component (i), comprising a metal hydroxide, a metal oxide, a poly(urea) particle, silica, or mixtures thereof; and
- a hydrophobic additive comprising a wax;
- wherein when the coating composition is applied to a substrate and cured as a coating, the coating has an 85° gloss of less than 3.5, a 60° gloss of less than 1.5, a water contact angle of greater than 80°, and desorbs a maximum of 180 micrograms of bis(2-chloroethyl) sulfide and a maximum of 40 micrograms of O-pinacolyl methylphosphonofluoridate, according to testing under MIL-PRF-32348.

19. The method of claim 18, further comprising dispersing the mixture in water.

20. The method of claim 19, further comprising drying the mixture to form a powder coating composition.

21. The coating composition of claim 1, where the wax comprises from 0.01 to 20 weight % based on the total solid weight of the coating composition.

\* \* \* \* \*